United States Patent
Takamichi

Patent Number: 6,072,776
Date of Patent: Jun. 6, 2000

[54] FAULT SELF-SUPERVISING SYSTEM OF CELL PROCESSOR

[75] Inventor: Toru Takamichi, Tokyo, Japan

[73] Assignee: NEC Corporation, Tokyo, Japan

[21] Appl. No.: 08/795,804

[22] Filed: Feb. 5, 1997

[30] Foreign Application Priority Data

Feb. 5, 1996 [JP] Japan ................................ 8-018819

[51] Int. Cl.⁷ .......................................... G06F 11/00
[52] U.S. Cl. ......................... 370/242; 370/395; 370/235
[58] Field of Search ................................. 370/230, 231, 370/232, 233, 234, 235, 236, 395, 242, 244, 248, 250, 252, 397, 410, 522

[56] References Cited

U.S. PATENT DOCUMENTS

| | | | |
|---|---|---|---|
| 5,381,407 | 1/1995 | Chao | 370/230 |
| 5,432,713 | 7/1995 | Takeo et al. | 370/232 |
| 5,465,348 | 11/1995 | Amemiya et al. | 370/230 |
| 5,524,006 | 6/1996 | Hluchj et al. | 370/233 |
| 5,566,163 | 10/1996 | Petit | 370/230 |
| 5,568,468 | 10/1996 | Ogasawara et al. | 370/230 |
| 5,666,353 | 9/1997 | Klausmeier et al. | 370/230 |
| 5,668,797 | 9/1997 | Fahmi et al. | 370/229 |
| 5,774,454 | 6/1998 | Kim et al. | 370/232 |

FOREIGN PATENT DOCUMENTS

| | | |
|---|---|---|
| 4192832 | 7/1992 | Japan. |
| 5110585 | 4/1993 | Japan. |
| 5191433 | 7/1993 | Japan. |
| 5327757 | 12/1993 | Japan. |
| 5347632 | 12/1993 | Japan. |
| 7327031 | 12/1995 | Japan. |
| 8-8916 | 1/1996 | Japan. |

OTHER PUBLICATIONS

Wu et al., "GCRA–based architecture of multiconnection shaper and enforcer in mulitiservice ATM networks", Computer Communications 20, 1997, pp. 681–693.

Primary Examiner—Chi H. Pham
Assistant Examiner—Frank Duong
Attorney, Agent, or Firm—Sughrue, Mion, Zinn, Macpeak & Seas, PLLC

[57] ABSTRACT

There is provided a fault self-supervising system of cell processor to execute fault supervising for internal circuit in the cell processor during the in-service period while the ordinary operation of the cell processor is kept without giving any influence on the main signal cell flow in the cell processor of the ATM network. In the structure of the fault self-supervising system of cell processor, the cell such as control cell or idle cell in the ATM cell flow which is not processed in the cell processor is overwritten by the supervising cell having a combination of VPI and VCI which is not used in the cell process and it is then applied in the preceding stage of the arithmetic circuit as the supervising object an is then transferred within the arithmetic circuit, the supervising information signal CHK indicating the operating condition of the arithmetic circuit obtained as a result of the transfer is compared and collated with the expected value E, a defective circuit of arithmetic circuit is detected from matching/mismatching as a result of comparison and the supervising cell is extracted in the subsequent stage of the arithmetic circuit.

20 Claims, 10 Drawing Sheets

| PATTERN NUMBER | EXPECTED VALUE Ep INDICATING CONDITION OF VSA CIRCUIT FOR Np | EXPECTED VALUE Ea INDICATING CONDITION OF VSA CIRCUIT FOR Na | POLICING PARAMETERS | | | |
|---|---|---|---|---|---|---|
| 1 | NEW | NEW | Np1, | Na1, | $\tau$p1, | $\tau$a1, |
| 2 | O K | NEW | Np2, | Na2, | $\tau$p2, | $\tau$a2, |
| 3 | NEW | NEW | Np3, | Na3, | $\tau$p3, | $\tau$a3, |
| 4 | N G | NEW | Np4, | Na4, | $\tau$p4, | $\tau$a4, |
| 5 | NEW | NEW | Np5, | Na5, | $\tau$p5, | $\tau$a5, |
| 6 | NEW | NEW | Np6, | Na6, | $\tau$p6, | $\tau$a6, |
| 7 | NEW | NEW | Np7, | Na7, | $\tau$p7, | $\tau$a7, |
| 8 | O K | O K | Np8, | Na8, | $\tau$p8, | $\tau$a8, |
| 9 | NEW | NEW | Np9, | Na9, | $\tau$p9, | $\tau$a9, |
| 10 | N G | O K | Np10, | Na10, | $\tau$p10, | $\tau$a10, |
| 11 | NEW | NEW | Np11, | Na11, | $\tau$p11, | $\tau$a11, |
| 12 | NEW | O K | Np12, | Na12, | $\tau$p12, | $\tau$a12, |
| 13 | NEW | NEW | Np13, | Na13, | $\tau$p13, | $\tau$a13, |
| 14 | O K | N G | Np14, | Na14, | $\tau$p14, | $\tau$a14, |
| 15 | NEW | NEW | Np15, | Na15, | $\tau$p15, | $\tau$a15, |
| 16 | N G | N G | Np16, | Na16, | $\tau$p16, | $\tau$a16, |
| 17 | NEW | NEW | Np17, | Na17, | $\tau$p17, | $\tau$a17, |
| 18 | NEW | N G | Np18, | Na18, | $\tau$p18, | $\tau$a18, |

Fig.8

| CONNEC-TION NUMBER | EXPECTED VALUE Ep INDICATING CONDITION OF VSA CIRCUIT FOR Np | EXPECTED VALUE Ea INDICATING CONDITION OF VSA CIRCUIT FOR Na | POLICING PARAMETERS | | | |
|---|---|---|---|---|---|---|
| 1 | NEW | NEW | Np1a, | Na1a, | $\tau$p1a, | $\tau$a1a, |
| | O K | NEW | Np1b, | Na1b, | $\tau$p1b, | $\tau$a1b, |
| 2 | NEW | NEW | Np2a, | Na2a, | $\tau$p2a, | $\tau$a2a, |
| | N G | NEW | Np2b, | Na2b, | $\tau$p2b, | $\tau$a2b, |
| 3 | NEW | NEW | Np3a, | Na3a, | $\tau$p3a, | $\tau$a3a, |
| | NEW | NEW | Np3b, | Na3b, | $\tau$p3b, | $\tau$a3b, |
| 4 | NEW | NEW | Np4a, | Na4a, | $\tau$p4a, | $\tau$a4a, |
| | O K | O K | Np4b, | Na4b, | $\tau$p4b, | $\tau$a4b, |
| 5 | NEW | NEW | Np5a, | Na5a, | $\tau$p5a, | $\tau$a5a, |
| | N G | O K | Np5b, | Na5b, | $\tau$p5b, | $\tau$a5b, |
| 6 | NEW | NEW | Np6a, | Na6a, | $\tau$p6a, | $\tau$a6a, |
| | NEW | O K | Np6b, | Na6b, | $\tau$p6b, | $\tau$a6b, |
| 7 | NEW | NEW | Np7a, | Na7a, | $\tau$p7a, | $\tau$a7a, |
| | O K | N G | Np7b, | Na7b, | $\tau$p7b, | $\tau$a7b, |
| 8 | NEW | NEW | Np8a, | Na8a, | $\tau$p8a, | $\tau$a8a, |
| | N G | N G | Np8b, | Na8b, | $\tau$p8b, | $\tau$a8b, |
| 9 | NEW | NEW | Np9a, | Na9a, | $\tau$p9a, | $\tau$a9a, |
| | NEW | N G | Np9b, | Na9b, | $\tau$p9b, | $\tau$a9b, |

Fig.9

FAULT SELF-SUPERVISING SYSTEM OF CELL PROCESSOR

BACKGROUND OF THE INVENTION

1. Field of the Invention

The present invention relates to a fault self-supervising system of a cell processor in the ATM network. Particularly, the present invention relates to a fault self-supervising system which can supervise a fault, without interruption of normal operation of a communication apparatus, of an internal circuit formed of digital logical circuits such as an algorithm circuit, etc. in a cell processor such as a cell rate supervising apparatus, a cell switch and a traffic shaper.

2. Description of the Related Art

A cell processor having a fault supervising function of the related art is shown in FIG. 10. This apparatus is provided, within the cell processor such as the cell rate supervising apparatus, cell switch and traffic shaper, with a supervising cell application section 5 in the front stage of an arithmetic circuit 8 as the supervising object and a supervising cell termination section 10 at the rear stage thereof and moreover it is also provided with a supervising result expected value generating section 9 which generates an expected value of supervising result, a supervising cell generating section 4 and a cell pattern comparison/collation section 11.

In the fault supervising operation of this apparatus, the supervising result expected value generation section 9 recognizes first the normal operation of the arithmetic circuit 8 and generates a data as the supervising result expected value depending on the data inputted to the arithmetic circuit 8. On the basis of this supervising result expected value, the supervising cell generating section 4 generates a supervising cell. The supervising cell application section 5 detects a cell for supervising cell insertion such as an idle cell or a control cell, such as an OAM (Operation and Maintenance) cell and RM (Resource Management) cell, included in the flow of main signal cell or a particular cell inserted in the flow of cell for inserting the supervising cell. Moreover, the supervising cell application section 5 writes data in the supervising cell pattern over the detected cell as insertion of supervising cell. The arithmetic circuit 8 as the supervising object executes the processing of cell regardless of the supervising cell or the ordinary cell, and outputs the main signal cell flow including the supervising cell. The supervising cell termination section 10 extracts the supervising cell from the main signal cell flow output from the arithmetic circuit 8 and outputs it to the cell pattern comparison/collation section 11. Moreover, the supervising cell termination section 10 restores the cell pattern of the supervising cell to the cell pattern appearing before overwritten in the supervising cell application section 5 and outputs it to the main signal cell flow. The cell pattern comparison and collation section 11 can check whether the arithmetic circuits within the cell processor operates normally or not by comparing and collating the supervising cell extracted by the supervising cell termination section 10 with the supervising result expected value generated by the supervising result expected value generation section 9. In this case, the supervising cell is formed by a pseudo random data is added as the supervising data to the information field. The cell pattern comparison and collation section 11 collates the information field of this supervising cell with the information field of the supervising result expected value received from the supervising result expected value generation section 9.

The fault supervising system of the related art shown in FIG. 10 is capable of detecting a fault of digital logical circuits in the arithmetic circuits 8 in such a case that a supervising information, generated by the arithmetic circuit 8, indicating whether the arithmetic circuits 8 as the supervising object is operating normally or not is included in the cell header or information field of the supervising cell. However, in the case of a cell processor which controls an output interval of cell like an example of the traffic shaping, in place of the case where the supervising information indicating the operating condition of the arithmetic circuit 8 is written in direct in the cell header or information field of the supervising cell, a fault in the arithmetic circuit 8 cannot be detected. Namely, a fault where the arithmetic circuit 8 does not transmit the cells in the normal output interval cannot be detected with the technology of related art to judge coincidence of collation between the supervising data after the processing and the expected value.

Moreover, when the cell processor is composed of a plurality of arithmetic circuits and the supervising information in the supervising cell is uniquely determined depending on the operating condition of one arithmetic circuit within the cell processor, a defective arithmetic circuit can be identified through collation of the supervising information, but if the supervising information in the supervising cell is determined depending on the operating condition of a plurality of arithmetic circuits in the cell processor, it has been difficult to identify the defective arithmetic circuits among a plurality of circuits. Namely, when a plurality of arithmetic circuits execute the branching processing depending on the contents of the supervising information in the supervising cell, even if mismatching between the supervising data of the processing result and the expected value is detected by collation, fault location has been impossible for a plurality of arithmetic circuits.

SUMMARY OF THE INVENTION

It is therefore an object of the present invention to provide a fault self-supervising system of cell processor which executes the fault supervising during execution of ordinary cell processing operation by establishing the connection, for supervising a fault, by using combination of VPI (Virtual Path Identifier) and VCI (Virtual Channel Identifier) which are not used as the end users connection nor the connection for control within the cell processor including the arithmetic circuits as the supervising objects.

A fault self-supervising system of cell processor, including arithmetic circuit as the supervising object in a cell processor of the ATM network comprising:

said arithmetic circuit comprising a means for outputting a supervising information signal CHK, made by processing an input cell, indicating the operating condition of said arithmetic circuit;

connection supervising section for supervising the main signal cell flow and setting connection information having a desired combination of VPI and VCI and detecting a cell as insertion of a supervising cell;

supervising result expected value generation section for making a supervising information pattern as a supervising expected value on the basis of said connection information and outputting a supervising expected value;

supervising cell generation section for generating a supervising cell having a set combination of VPI and VCI on the basis of supervising expected value from said supervising result expected value generation section;

supervising cell application section for overwriting a supervising cell from said supervising cell generation section on said cell for inserting a supervising cell in the main signal cell flow in the preceding stage of said arithmetic circuit;

supervising cell termination section for removing said supervising cell from the main signal cell flow and outputting said main signal cell flow having a cell pattern before being overwritten a supervising cell in the subsequent stage of said arithmetic circuit;

supervising result comparison and collation section for detecting a fault of said arithmetic circuit by comparing and collating said supervising information signal CHK from said arithmetic circuit with said supervising expected value from said supervising result expected value generation section in the subsequent stage of said arithmetic circuit.

The connection supervising section of the fault self-supervising system of cell processor includes:

means for setting a connection information having a combination of VPI and VCI to which end user connection and apparatus control connection are not set.

The connection supervising section of the fault self-supervising system of cell processor also includes:

means for detecting an idle cell or a controll cell such as an Operation and Maintenance Cell and a Resource Management Cell as a supervising cell.

A fault self-supervising system of cell processor, including a plurality of arithmetic circuits as the supervising object in a cell processor of the ATM network comprising:

each of said arithmetic circuits comprising means for outputting a supervising information signal CHK, made by processing an input cell, indicating the operating condition of each arithmetic circuit;

connection supervising section for supervising the main signal cell flow and setting connection information having a desired combination of VPI and VCI and detecting a cell as insertion of a supervising cell;

supervising result expected value generation section for making supervising information patterns as supervising expected values, each corresponding to each expected value to be output from each arithmetic circuit, on the basis of said connection information and outputting respective supervising expected values;

supervising cell generation section for generating a supervising cell having a set combination of VPI and VCI on the basis of supervising expected value from said supervising result expected value generation section;

supervising cell application section for overwriting a supervising cell from said supervising cell generation section on said cell for inserting a supervising cell in the main signal cell flow in the preceding stage of said arithmetic circuit;

supervising cell termination section for removing said supervising cell from the main signal cell flow and outputting said main signal cell flow having a cell pattern before being overwritten a supervising cell in the subsequent stage of said arithmetic circuit;

a plurality of collation circuits for comparing and collating respective supervising information signals CHK from each arithmetic circuit and respective supervising expected values each corresponding to each expected value to be output from each arithmetic circuit; and OR circuit for result of comparison and collation of a plurality of said collation circuits.

The connection supervising section of the fault self-supervising system of cell processor further includes:

means for setting a connection-information having a combination of VPI and VCI to which end user connection and apparatus control connection are not set.

The connection supervising section of the fault self-supervising system of cell processor still further includes:

means for detecting an idle cell or a controll cell such as an Operation and Maintenance Cell and a Resource Management Cell as a supervising cell.

The fault self-supervising system of cell processor includes a plurality of arithmetic circuits as the supervising object within cell processor which comprise respectively a discriminating circuit for identifying the circuits operating normally from the arithmetic circuits connected in series as the supervising object.

The fault self-supervising system of cell processor includes a plurality of arithmetic circuits as the supervising object within cell processor which comprise respectively a discriminating circuit for identifying the circuits generating a fault from the arithmetic circuits connected in parallel as the supervising object.

The arithmetic circuit as the supervising object within the cell processor of the fault self-supervising system of cell processor is formed of a plurality of arithmetic circuits comprised in the cell rate supervising apparatus within said cell processor.

The arithmetic circuit as the supervising object within the cell processor of the fault self-supervising system of cell processor is formed of a supervising object within the cell processor is formed of a plurality of arithmetic circuits comprised in a traffic shaping apparatus within said cell processor.

BRIEF DESCRIPTION OF THE DRAWINGS

Other objects and advantages of the present invention will be apparent from the following detailed description of the presently preferred embodiment thereof, which description should be considered in conjunction with the accompanying drawings in which:

FIG. 8 is a diagram showing an example of combination between the supervising result expected values Ep and Ea for fault supervising of VSA circuit for Np and VSA circuit for Na in the cell rate supervising apparatus in the present invention;

FIG. 9 is a diagram showing another example of combination between the supervising result expected values Ep and Ea for fault supervising of VSA circuit for Np and VSA circuit for Na in the cell rate supervising apparatus in the present invention.

DETAILED DESCRIPTION OF THE PREFERRED EMBODIMENTS

Figure 1:
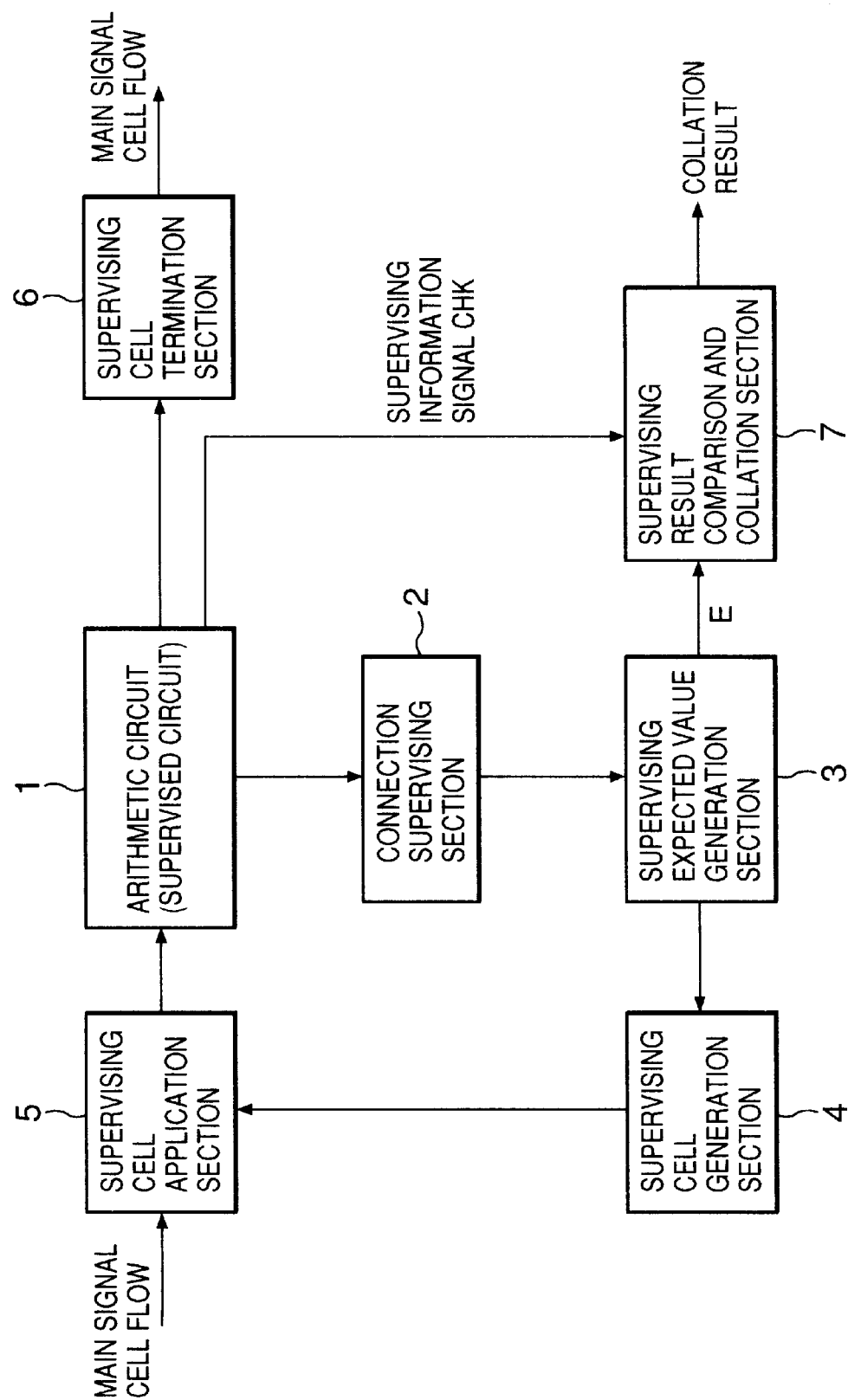
FIG. 1 is a block diagram showing the basic structure of a fault self-supervising system of cell processor of the present invention.

A basic structure of the fault self-supervising system of cell processor of the present invention is shown in FIG. 1. The cell processor comprising the fault self-supervising system of the present invention comprises an arithmetic circuit 1 as the supervising object, a supervising cell generation section 4, a supervising cell application section 5, a connection supervising section 2, a supervising result expected value generation section 3, a supervising result comparison and collation section 7 and a supervising cell termination section 6.

The present invention has the structure explained above and establishes the condition where a virtual supervising connection is formed within the arithmetic circuit 1 through the following operations.

A connection supervising section 2 searches combinations of VPI (Virtual Path Identifier) and VCI (Virtual Channel Identifier) which are not used in the cell processor for connection between end users and connection for control, and can be used in this cell processor to detect the cells which do not give adverse effect on ordinary operation of a communication apparatus even if a supervising cell is inserted. This detection may be possible through the searches with a means other than the cell processor such as OPS (Operation System). On the basis of the supervising expected value generated by the supervising expected value generation section 3, the supervising cell generation section 4 generates a supervising cell having combination of searched VPI and VCI. The supervising cell application section 5 overwrites the supervising cell, at the freely determined desired time, on the cell for inserting supervising cell on the main signal cell flow detected by the search with the connection supervising section 2 or the search with the means other than the cell processor such as OPS (Operation System).

When the supervising connection is set as explained above, the arithmetic circuit 1 processes the supervising cell in the same manner as the cell of ordinary connection. The arithmetic circuit 1 further outputs the supervising information signal CHK, described later, which can be obtained as a result of processing for this supervising cell indicating the operating condition of the circuits and main signal cell flow. An output of the supervising result comparison and collation section 7 usually fixes the collation result to the coincidence side. However, when the supervising cell is applied by the supervising cell application section 5, the supervising result comparison and collation section 7 compares and collates the supervising information signal CHK of the arithmetic circuit 1 as the supervising object with the supervising expected value E generated by the supervising expected value generation section 3 to detect a fault of the internal circuit of the arithmetic circuit 1. The supervising cell termination section 6 detects the supervising cell and restores the cell pattern of supervising cell to the cell pattern appearing before the cell is overwritten to the supervising cell in the supervising cell application section 5 or into the other predetermined cell pattern.

According to the structure explained above, in the cell processor, if the cell on the main signal cell flow overwritten as the supervising cell is assumed as the cell which does not give any influence on operations of the arithmetic circuit 1 like the control cell or idle cell, since the cell flow of an ordinary connection having the combination of VPI and VCI other than the supervising cell in the cell header is never overwritten as the supervising cell, such connection is never given the influence. Therefore, the cell processor of the present invention can execute fault self-supervising for the arithmetic circuit 1 formed of the digital logical circuits while keeping the ordinary operating condition without interrupting the ordinary cell processing operation of ordinary connections.

Moreover, when the arithmetic circuit 1 has a plurality of logical paths (this path is tentatively called a logical path) as the arithmetic processing flow and each logical path is formed of different digital logical circuits, the digital logical circuits having higher operation frequency and the digital logical circuits having lower operation frequency exist within the arithmetic circuit 1, but since a fault of the digital logical circuit of logical path having lower operation frequency cannot be detected until such corresponding logical path operates, a large delay time may be generated in the period from generation of fault to detection thereof. Since the operation frequency is varied depending on the pattern of cell header or information field of cell processed by the arithmetic circuit 1, or cell interval, a fault of the digital logical circuit having a lower operation frequency can often be supervised and detected by changing the pattern of cell header or information field of the supervising cell, or supervising cell interval so that all logical paths are equally put into the operating condition.

Since the supervising connection is a pseudo connection used by selecting a combination of VPI and VCI which is not used as the end user connection or apparatus control connection in the arithmetic circuit 1 and it is terminated with the supervising cell termination section 6, it does not give any influence on the input/output main signal cell flow of the cell processor and operations of the arithmetic circuit 1.

Figure 2:
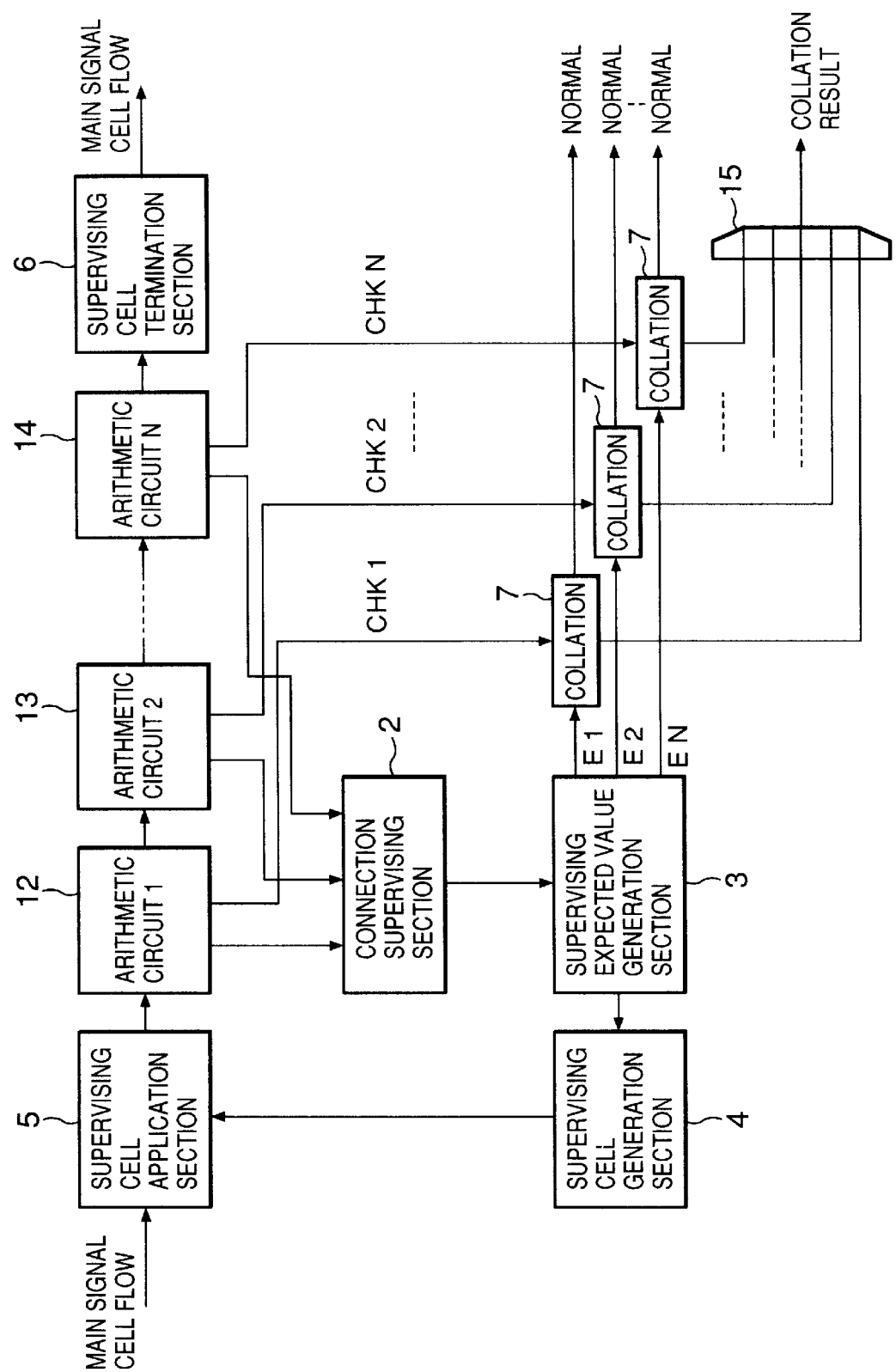
FIG. 2 is a block diagram showing the structure of a plurality of arithmetic circuits connected in series in a fault self-supervising system of cell processor of the present invention.
Figure 3:
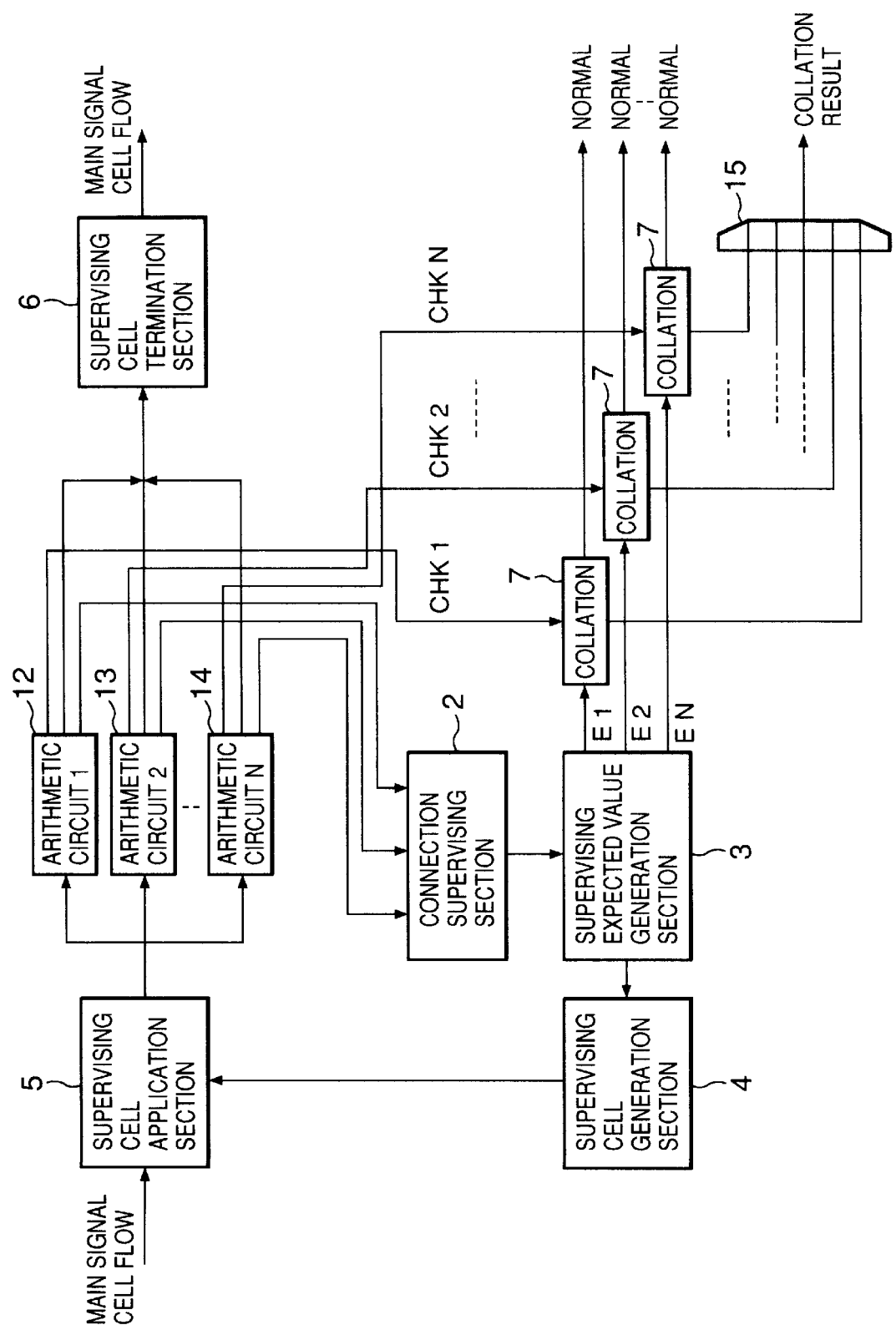
FIG. 3 is a block diagram showing the structure of a plurality of arithmetic circuits connected in parallel in a fault self-supervising system of cell processor of the present invention.

Moreover, as shown in FIG. 2, when the cell processor is formed of a plurality of arithmetic circuits including the first arithmetic circuit 12, second arithmetic circuit 13 . . . , Nth arithmetic circuit 14, each arithmetic circuit outputs the supervising information signals CHK1, CHK2 to CHKN to output N supervising information signals in total, while the supervising result expected value generation section 3 also outputs N supervising result expected values of E1, E2 to EN each corresponding to each expected value to be output from each arithmetic circuit to collate these N values in the supervising result comparison and collation section (collating section) 7 and inputs the 1-bit signal indicating the result of collation (Normal: 0, illegal: 1) to an OR circuit 15 to simultaneously detect a fault in the N arithmetic circuits from the output of OR circuit. In this case, when the arithmetic circuit in which the supervising information indicating the operating condition is not written in the cell header and information field of the supervising cell is outputting the supervising information signal CHK, the fault detection is possible for such arithmetic circuit. In addition, even if the supervising information written in the cell header and information field of the supervising cell cannot be uniquely determined by the operating condition of one arithmetic circuit, it is possible to identify the defective arithmetic circuit. In FIG. 2, the first arithmetic circuit 12, second arithmetic circuit 13, . . . , Nth arithmetic circuit 14 are cascade-connected, the circuits operating normally in these arithmetic circuits can be identified from the result of collation by the N supervising result comparison and collation sections 7. Meanwhile, as shown in FIG. 3, when the first arithmetic circuit 12, second arithmetic circuit 13, . . . , Nth arithmetic circuit 14 are connected in parallel, the defective arithmetic circuits can be identified from the result of collation by N collation results of the supervising result comparison and collation section 7.

The fault self-supervising system of the cell processor of the present invention can also be applied to the case where the arithmetic circuit 1 as the supervising object is formed not only of the digital logical circuit but also of software such as CPU and processor.

Figure 4:
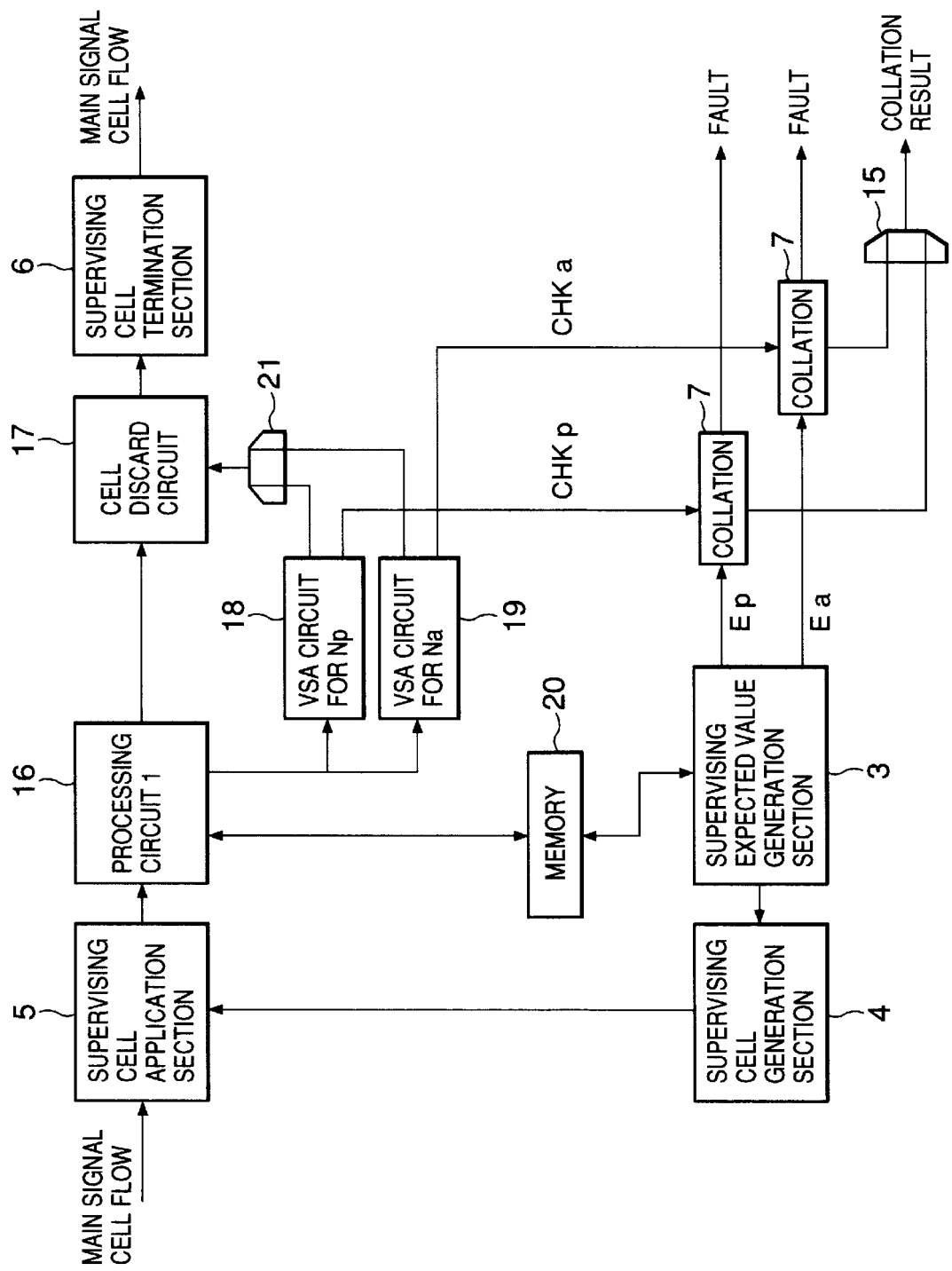
FIG. 4 is a block diagram showing an example of a cell rate supervising apparatus to which a fault self-supervising system of cell processor of the present invention is applied.

As a practical embodiment of the cell processor to which the fault self-supervising system of the present invention is applied, an example of the structure of a cell rate supervising apparatus is shown in the block diagram of FIG. 4. In general, as the cell rate supervising apparatus, there is UPC (Usage Parameter Control) apparatus and NPC (Network Parameter Control) apparatus. These apparatuses are so-called Policing apparatuses to check whether the traffic rate of the desired connection designated has been conforming the previously declared traffic rate or not. Whether the peak cell rate Np and average cell rate Na of the cell flow of the desired connection designated has exceeded the previously declared value or not is inspected using VSA (Virtual Scheduling Algorithm) or CSLBA (Continuous State Leaky Bucket Algorithm) explained later. When both Np and Na are lower than the declared cell rate, cell is allowed to pass, but when any one of Np and Na violates the declared value, such cell is discarded as an non-conforming cell or rendered the tagging process. In this tagging process, a tag indicating an non-conforming cell is attached to a cell and the non-conforming cell is sent to the network. Such non-conforming cell is discarded depending on the traffic condition of the network.

Figure 5:
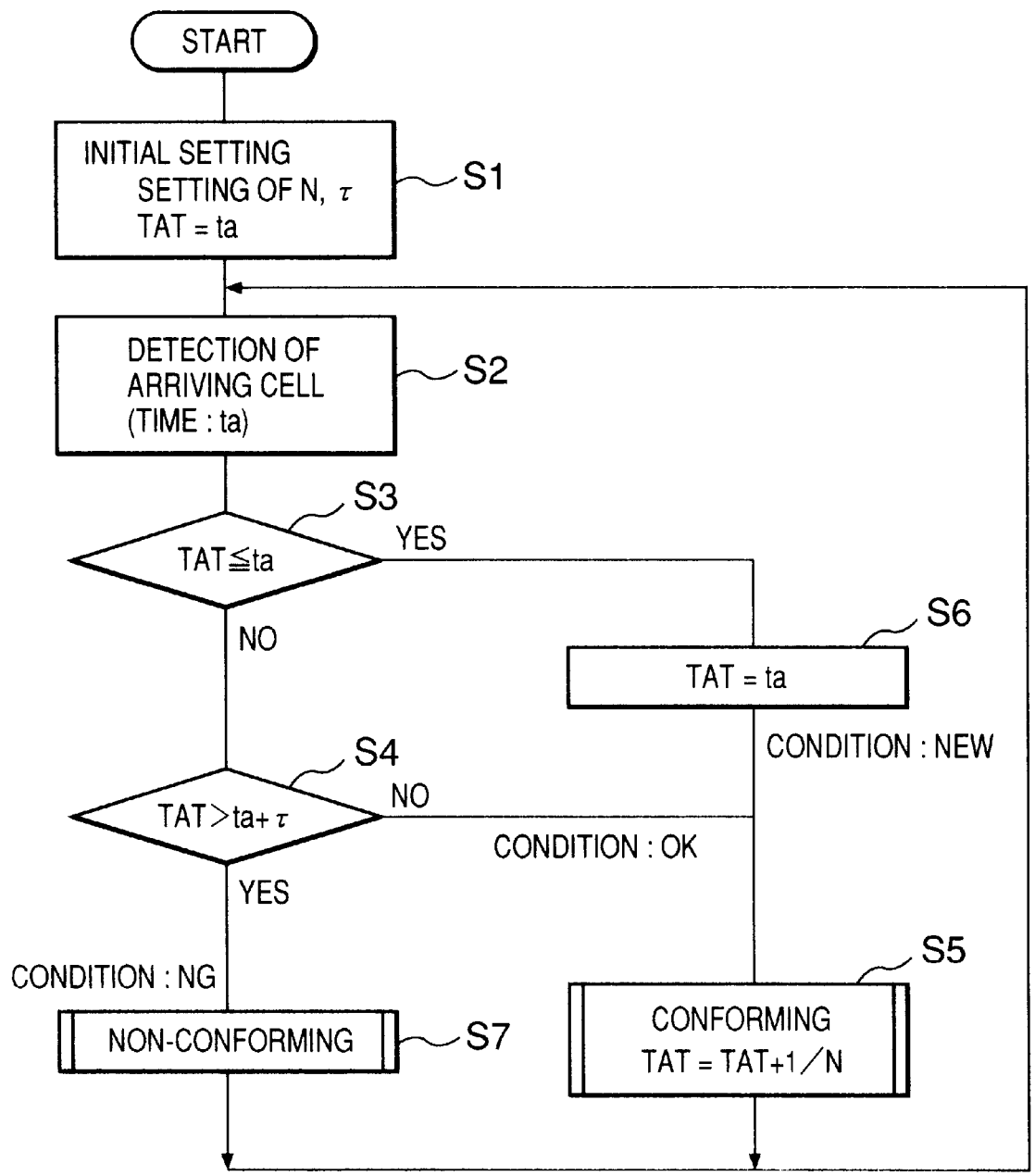
FIG. 5 is a processing flowchart of VSA (Virtual Scheduling Algorithm) indicating operation of an ordinary cell rate supervising apparatus.

FIG. 5 is a VSA processing flowchart indicating the operations of an ordinary cell rate supervising apparatus. With the actual process executed by VSA or CSLBA, the peak cell interval 1/Np which is an inverse number of the peak cell rate and an average cell interval 1/Na which is an inverse number of the average cell rate are supervised. In this process, the cell rate N, threshold value $\tau$ and theoretical arriving time TAT are initialized first. Here, the theoretical arriving time TAT means the arriving time of the next cell which can be assumed from the arriving time of the latest cell arrived and cell rate. After the initialization (S1 of FIG. 5), the cell arriving time ta (S2 of FIG. 5) is compared with the theoretical arriving time TAT of cell (S3 of FIG. 5). When TAT$\leq$ta, namely the cell has arrived after TAT, TAT is replaced with ta (S6 of FIG. 5) and this cell is judged to satisfy the declaration. Thereby, the theoretical arriving time TAT is updated as follow by the addition parameter N (S5 of FIG. 5).

TAT=max (ta, TAT)+1/N.

This condition is defined as condition : NEW. Meanwhile, when TAT>ta in S3, namely when the cell has arrived before TAT, a sum of ta and threshold value $\tau$ is compared with the theoretical arriving time TAT of cell (S4 of FIG. 5). If not TAT>ta+$\tau$, this cell is judged to satisfy the declaration and TAT is updated by N (S5 of FIG. 5). This condition is defined as condition:OK. On the other hand, when TAT>ta+$\tau$ in S4, the cell is judged as the non-conforming cell (S7 of FIG. 5). This condition is defined as condition:NG. As explained above, VSA takes three kinds of condition depending on the result of comparison among ta, $\tau$ and TAT. When respective logical paths are formed of digital logical circuit, three paths are formed and different digital logical circuits operate depending on the result of comparison among ta, $\tau$ and TAT. When $\tau$ takes the allowable value $\tau$p of cell delay variation CDV (Cell Delay Variation) and N=Np, VSA is used for supervising peak cell rate and when $\tau$ takes the allowable value $\tau$ a and N=Na, VSA is used for supervising average cell rate.

FIG. 4 is a block diagram of a cell rate supervising apparatus to which the fault self-supervising system of cell processor of the present invention is applied. The cell rate supervising apparatus for checking Np and Na using the VSA circuit comprises, as shown in FIG. 4, a processing circuit 16, a cell discard circuit 17, VSA circuit for Np 18, VSA circuit for Na 19, a memory 20, an OR circuit 21 and moreover the supervising cell application section 5, supervising cell termination section 6, supervising result expected value generation section 3, supervising cell generation section 4, supervising result comparison and collation section 7 and OR circuit 15.

Next an example of the operations of the cell rate supervising apparatus for checking Np and Na using the VSA circuit will be explained. First, the processing circuit 16 measures the arriving time ta of the arriving cell in the main signal and simultaneously discriminates a connection number from VPI or VCI or from both of them in the cell header of the arriving cell. Moreover, the processing circuit 16 discriminates a kind of cell from the cell header to judge whether the Policing should be done to the arriving cell or not. When the processing circuit 16 has judged to perform the Policing, the parameters (Np, Na, $\tau$p, $\tau$a and TAT) for the Policing corresponding to the connection of the arriving cell are read from the memory 20 and the parameters for Policing operation and ta are sent to the VSA circuits 18 and 19. The VSA circuit 18 for Np executes the arithmetic operation in the circuit composed of the digital logical circuits depending on the arriving time ta and parameter for the Policing operation and outputs the conforming/non-conforming (conforming: 0, non-conforming: 1) result of 1-bit signal by judging whether the arriving cell has exceeded (non-conforming) the previously declared peak rate value or is within the declared peak rate value. The VSA circuit 19 for Na also executes the arithmetic operation in the circuit composed of the digital logical circuits depending on the arriving time ta and parameter for the Policing operation and outputs the conforming/non-conforming (conforming: 0, non-conforming: 1) result of 1-bit signal by judging whether the arriving cell has exceeded the previously declared average rate (non-conforming) or within the declared average rate value. The cell discard circuit 17 executes the discard process, when the one bit output signal of the OR circuit 21 is 1, considering the arriving cell as the non-conforming cell for the previously declared rate and, on the other hand, allows the one bit output signal of the OR circuit 21, when it is 0, to pass considering it as the conforming cell for the previously declared rate.

Operations of the fault self-supervising system of cell processor of the present invention will then be explained with reference to FIG. 4.

The supervising expected value generation section 3 always supervises the memory 20 and searches the combination of VPI and VCI, which are not allocated for the end user connection and control connection, in the cell rate supervising apparatus among the combinations of VPI and VCI which can be processed within the cell rate supervising apparatus to obtain the supervising connection or establishes the combination between VPI and VCI instructed from an external means of the cell processor such as OPS or the like as the supervising connection to freely set the parameters for the Policing operation to the area corresponding to the supervising connection in the memory 20. A practical example for setting of the parameters to the memory will be explained later. When a kind of cell discriminated by the processing circuit 16 is the cell which is previously determined to be overwritten to the supervising cell (namely, the cell which is judged by the processing circuit 16 to be subject to the Policing operation by discriminating a connection number from VPI or VCI or both of them of the cell header of the arriving cell and by judging a kind of cell from the cell header, the supervising cell generation section 4 generates the supervising cell having the combination of VPI and VCI determined as the supervising connection in the cell header. The supervising cell application section 5 overwrites the arriving cell with this supervising cell or allows the arriving cell to pass without overwriting. Whether the supervising cell application section 5 overwrite the arriving cell into the supervising cell or not is freely determined by the supervising result expected value generation section 3 or by the external means of the cell processor such as OPS or the like. At the time of overwriting the arriving cell to the supervising cell, the processing circuit 16 reads the parameters for executing the Policing operation set up in the area corresponding to the supervising connection on the memory 20 and then sends such parameters together with ta to the VSA circuit 18 for Np and the VSA circuit 19 for Na. The VSA circuits 18 and 19 execute the Policing operation to such supervising cell as in the case of the cell of the other normal connection and moreover the OR circuit 21 and cell discard circuit 17 also execute the normal operations. The supervising cell termination section 6 rewrites the supervising cell to the cell pattern before it is overwritten to the supervising cell in the supervising cell application section 5 or rewrites it to the determined cell pattern.

The supervising result comparison and collation section 7 fixes, when the Policing object cell is the cell of a normal connection, its output to the coincidence side but compares and collates, when the Polishing object cell is the supervising cell, the supervising information signal CHKp indicating the internal operation condition of the VSA circuit 18 for Np with the expected value Ep generated by the supervising expected value generation section 3. When these are matched, operations of the VSA circuit 18 for Np and the processing circuit 16 is judged as normal, but when these are not matched, it suggests that a fault is generated in the VSA circuit 18 for Np or in the processing circuit 16. In the same manner, the supervising information signal CHKa indicating the internal operation condition of the VSA circuit 19 for Na is compared with the expected value Ea generated by the supervising expected value generation section 3. When these are matched, operation of the VSA circuit 19 for Na and the processing circuit 16 is judged normal but if these are not matched, it suggests that a fault is generated in the VSA circuit 19 for Na or in the processing circuit 16. Moreover, a fault in any of the VSA circuit 18 for Np, VSA circuit 19 for Na and processing circuit 16 can also be detected from an output of the OR circuit 15.

Figure 6:
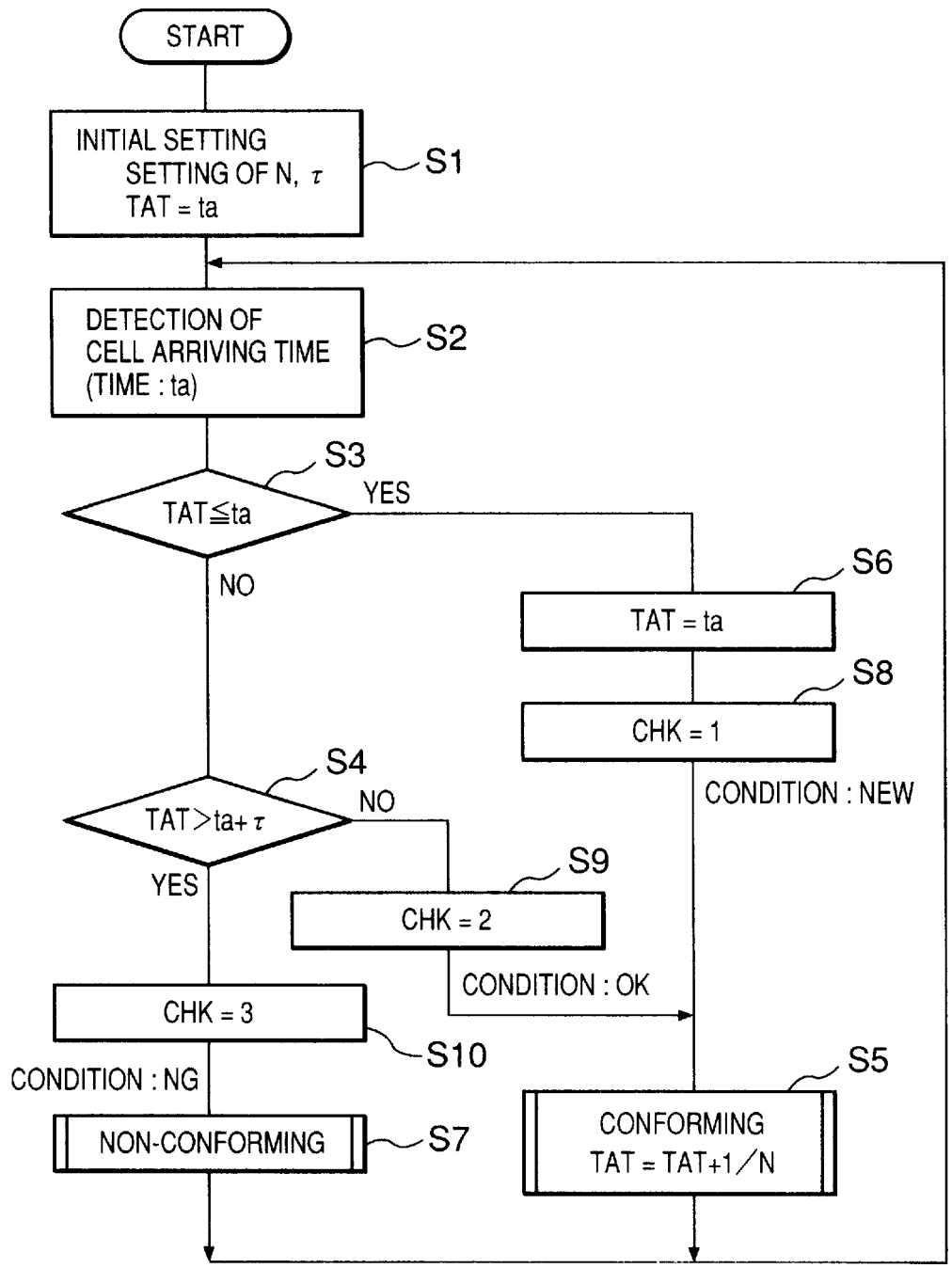
FIG. 6 is a flowchart of VSA which is a cell rate supervising algorithm of the present invention.

FIG. 6 is a processing flowchart of VSA showing operations of the cell rate supervising apparatus to which the present invention is applied and it is an example of the processing for outputting the supervising information signal CHK from the VSA circuit. As is explained in regard to FIG. 5, VSA takes three kinds of conditions depending on the comparison result of ta, $\tau$ and TAT. Three paths are formed and different digital logical circuits operate when three kinds of logical paths are formed with the digital logical circuits. The supervising information signal CHK of 2-bit indicating the internal condition of the VSA circuit is defined and when condition ta$\geq$TAT : NEW in S3, CHK=1 can be obtained (S8), when condition TAT$-\tau\leq$ta:OK in S4, CHK=2 can be obtained (S9) and when condition ta<TAT$-\tau$:NG in S4, CHK=3 can be obtained (S10).

This CHK is respectively output from the VSA circuit 18 for Np and VSA circuit 19 for Na as CHKp and CHKa. Moreover, the supervising expected value generation section 3 also outputs the expected values Ep and Ea of 2-bit for respective CHK for comparison in the supervising result comparison and collation section 7.

As shown in FIG. 8, fault detection can be made periodically for the combinations (CHKp=1/2/3) which CHKp of the VSA circuit for peak can take and the combinations (CHKa=1/2/3) which CHKa for the VSA circuit for average can take by preparing, for the supervising connection (pattern number) having a certain kind of combination of VPI and VCI, the parameters (Np1 to Np18, Na1 to Na18, $\tau$p1 to $\tau$p18, $\tau$a1 to $\tau$a18) for 18 kinds of Policing operation such as (condition of VSA circuit for Np, condition of VSA circuit for Na)=(NEW, NEW) (OK, NEW) (NEW, NEW) (NG, NEW) (NEW, NEW) (NEW, NEW) (NEW, NEW) (OK, OK) (NEW, NEW) (NG, OK) (NEW, NEW) (NEW, OK) (NEW, NEW) (OK, NG) (NEW, NEW) (NG, NG) (NEW, NEW) (NEW, NG) and then using these parameters periodically.

Otherwise, as shown in FIG. 9, fault detection can also be made periodically for the combinations (CHKp=1/2/3) which CHKp of the VSA circuit for peak can take and combinations (CHKa=1/2/3) which CHKa of the VSA circuit for average can take by preparing nine different supervising connections (connection numbers) and also preparing parameters for Polishing operation (Np1a and Np1b to Np9a and Np9b, Na1a and Na1b to Na9a and Na9b, $\tau$p1a and $\tau$p1b to $\tau$p9a and $\tau$p9b, $\tau$a1a and $\tau$a1b to $\tau$a9a and $\tau$a9b) giving the result of the Policing operation of the respective supervising cell such as repetition of (condition of the VSA circuit for Np, condition of the VSA circuit for Na)=(NEW, NEW) and (OK, NEW), repetition of (NEW, NEW) and (NG, NEW), repetition of (NEW, NEW), repetition of (NEW, NEW) and (OK, OK), repetition of (NEW, NEW) and (NG, OK), repetition of (NEW, NEW) and (NEW, OK), repetition of (NEW, NEW) and (OK, NG), repetition of (NEW, NEW) and (NG, NG) and repetition of (NEW, NEW) and (NEW, NG) and then using these parameters periodically.

Figure 7:
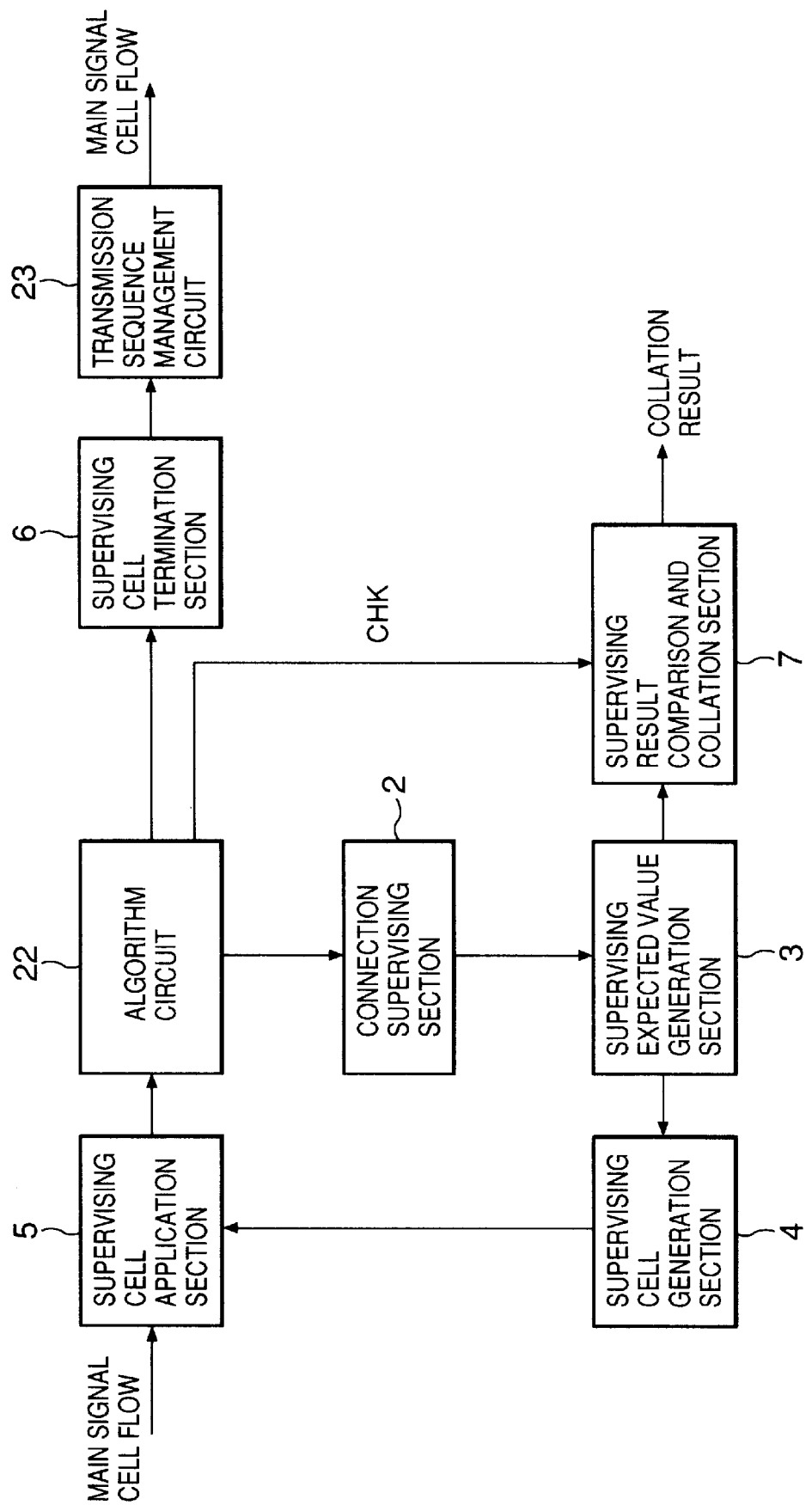
FIG. 7 is a block diagram showing an example of a traffic shaping apparatus to which a fault self-supervising system of cell processor of the present invention.
Figure 10:
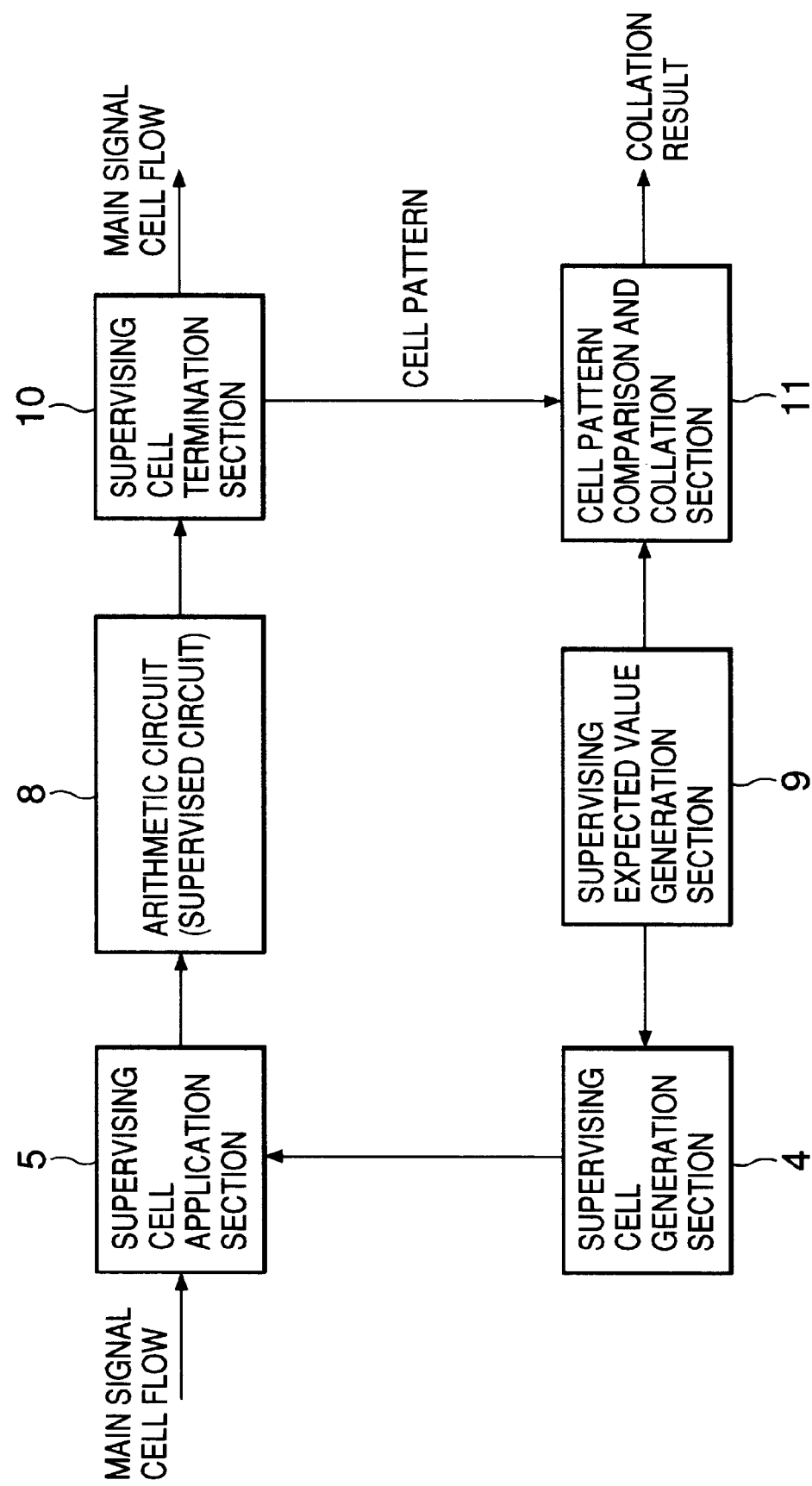
FIG. 10 is a block diagram showing a structure of a cell processor having a fault supervising function of the related art.

FIG. 7 is a block diagram of the traffic shaping apparatus to which the fault self-supervising system of processor of the present invention is applied.

The traffic shaping apparatus executes management of cell transmission sequence on the basis of the ideal transmitting time of the relevant cell for the cell flow of the desired connection. This traffic shaping apparatus is composed, for the fault supervising of the algorithm circuit 22, of an algorithm circuit 22 for calculating the ideal cell transmission time and a transmission sequence management circuit 23 for executing management of sequence of the cell flow on the basis of the calculated ideal transmission time.

For this purpose, the traffic shaping apparatus comprises a connection supervising section 2 for execute the fault supervising, a supervising cell application section 5, a supervising cell termination section 6, a supervising expected value generation section 3, a supervising cell generation section 4 and a supervising result comparison and collation section 7. When the supervising cell is input to the transmission sequence management circuit 23, the supervising cell which intrinsically should not exist on the transmission line and the cell of the normal connection which should intrinsically exist on the transmission line may compete with each other in the output operation, probably giving an influence on the transmission sequence management of the cell of the normal connection. Therefore, the supervising cell termination section 6 is provided in the preceding stage of the transmission sequence management circuit 23.

As explained above, according to the present invention, since the connection having the combination of VPI and VCI not used as the end user connection and control connection in the cell processor including the arithmetic circuits as the supervising object is utilized for fault supervising, fault supervising can be realized while the ordinary cell processing is executed in the in-service mode.

Moreover, even when the cell processor is formed of a plurality of arithmetic circuits, a defective arithmetic circuit among a plurality of circuits can be identified.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A fault self-supervising system of a cell processor in an ATM network, including an arithmetic circuit serving as a supervising object in the cell processor, said arithmetic circuit outputting a supervising information signal CHK, made by processing an input cell, said supervising information signal indicating an operating condition of said arithmetic circuit, said fault self-supervising system comprising:

connection supervising section for supervising a main signal cell flow and setting connection information having a desired combination of a virtual path identifier (VPI) and a virtual channel identifier (VCI) and detecting a cell as insertion of a supervising cell;

supervising result expected value generation section for making a supervising information pattern as a supervising expected value based on said connection information and outputting the supervising expected value;

supervising cell generation section for overwriting the supervising cell having a set combination of VPI and VCI based on the supervising expected value from said supervising result expected value generation section;

supervising cell application section for overwriting the supervising cell from said supervising cell generation section on said cell for inserting the supervising cell in the main signal cell flow in a stage preceding said arithmetic circuit;

supervising cell termination section for removing said supervising cell from the main signal cell flow and outputting said main signal cell flow having a cell pattern before being overwritten by said supervising cell application section, said supervising cell termination section being disposed in a stage subsequent to said arithmetic circuit;

supervising result comparison and collation section for detecting a fault of said arithmetic circuit by comparing and collating said supervising information signal CHK from said arithmetic circuit with said supervising expected value from said supervising result expected value generation section, said supervising result comparison and collation section being disposed subsequent to said arithmetic circuit.

2. The fault self-supervising system of cell processor as set forth in claim 1, wherein said connection supervising section further comprising:

means for setting a connection information having a combination of VPI and VCI to which end user connection and apparatus control connection are not set.

3. The fault self-supervising system of cell processor as set forth in claim 1, wherein said connection supervising section further comprising:

means for detecting an idle cell or a control cell such as an Operation and Maintenance cell and a Resource Management cell as the supervising cell.

4. The system of claim 1, wherein the supervising cell application section overwrites the supervising cell in an area other than an area used for ordinary connection cell flow and said fault self-supervising system does not interrupt ordinary operating conditions of the cell processor.

5. A fault self-supervising system of a cell processor in an ATM network, including a plurality of arithmetic circuits, said plurality of arithmetic circuits serving as a supervising object in the cell processor, wherein each of said plurality of arithmetic circuits outputs a supervising information signal CHK, made by processing an input cell, each supervising information signal respectively indicating an operating condition of each respective arithmetic circuit, said fault self-supervising system comprising:

connection supervising section for supervising a main signal cell flow and setting connection information having a desired combination of a virtual path identifier (VPI) and a virtual channel identifier (VCI) and detecting a cell as insertion of the supervising cell;

supervising result expected value generation section for making supervising information patterns as supervising expected values, each corresponding to a respective expected value to be output from each arithmetic circuit based on said connection information and outputting respective supervising expected values;

supervising cell generation section for generating the supervising cell having a set of combination of VPI and VCI based on respective supervising expected values from said supervising result expected value generation section;

supervising cell application section for overwriting the supervising cell from said supervising cell generation section on said cell for inserting the supervising cell in the main signal cell flow in a stage preceding said plurality of arithmetic circuits;

supervising cell termination section for removing said supervising cell from the main signal cell flow and outputting said main signal cell flow having a cell pattern before being overwritten by said supervising cell application section, said supervising cell termination section being disposed in stage subsequent to said arithmetic circuit;

a plurality of collation circuits for comparing and collating respective supervising information signals CHK from each arithmetic circuit and respective supervising expected values each corresponding to each expected value to be output from each arithmetic circuit; and OR circuit for comparison and collation of outputs from said plurality of said collation circuits.

6. The fault self-supervising system of cell processor as set forth in claim 5, wherein said connection supervising section further comprising:

means for setting a connection information having a combination of VPI and VCI to which end user connection and apparatus control connection are not set.

7. The fault self-supervising system of cell processor as set forth in claim 6, wherein the plurality of arithmetic circuits as the supervising object within the cell processor comprise respectively a discriminating circuit for identifying the circuits operating normally from the arithmetic circuits connected in series as the supervising object.

8. The fault self-supervising system of cell processor as set forth in claim 6, wherein the plurality of arithmetic circuits as the supervising object within the cell processor comprise respectively a discriminating circuit for identifying the circuits generating a fault from the arithmetic circuits connected in parallel as the supervising object.

9. The fault self-supervising system of cell processor as set forth in claim 6, wherein said plurality of arithmetic circuits as the supervising object within the cell processor is formed of a plurality of arithmetic circuits in a cell rate supervising apparatus within said cell processor.

10. The fault self-supervising system of cell processor as set forth in claim 6, wherein said plurality of arithmetic circuits as the supervising object within the cell processor is formed of a plurality of arithmetic circuits comprised in a traffic shaping apparatus within said cell processor.

11. The fault self-supervising system of cell processor as set forth in claim 5, wherein said connection supervising section further comprising:

means for detecting an idle cell or a control cell such as an Operation and Maintenance cell and a Resource Management cell as a supervising cell.

12. The fault self-supervising system of cell processor as set forth in claim 11, wherein the plurality of arithmetic circuits as the supervising object within the cell processor comprise respectively a discriminating circuit for identifying the circuits operating normally from the arithmetic circuits connected in series as the supervising object.

13. The fault self-supervising system of cell processor as set forth in claim 11, wherein the plurality of arithmetic circuits as the supervising object within the cell processor comprise respectively a discriminating circuit for identifying the circuits generating a fault from the arithmetic circuits connected in parallel as the supervising object.

14. The fault self-supervising system of cell processor as set forth in claim 11, wherein said plurality of arithmetic circuits as the supervising object within the cell processor is formed of a plurality of arithmetic circuits comprised in a cell rate supervising apparatus within said cell processor.

15. The fault self-supervising system of cell processor as set forth in claim 11, wherein said plurality of arithmetic circuits as the supervising object within the cell processor is formed of a plurality of arithmetic circuits comprised in a traffic shaping apparatus within said cell processor.

16. The fault self-supervising system of cell processor as set forth in claim 5, wherein the plurality of arithmetic circuits as the supervising object within the cell processor comprises respectively a discriminating circuit for identifying the circuits operating normally from the arithmetic circuits connected in series as the supervising object.

17. The fault self-supervising system of cell processor as set forth in claim 5, wherein the plurality of arithmetic circuits as the supervising object within the cell processor comprises respectively a discriminating circuit for identifying the circuits generating a fault from the arithmetic circuits connected in parallel as the supervising object.

18. The fault self-supervising system of cell processor as set forth in claim 5, wherein said arithmetic circuit as the supervising object within the cell processor is formed of the plurality of arithmetic circuits comprised in a cell rate supervising apparatus within said cell processor.

19. The system of claim 5, wherein an output of said OR circuit determines which of said plurality of arithmetic circuits includes an operational error.

20. The fault self-supervising system of cell processor as set forth in claim 5, wherein said arithmetic circuit as the supervising object within the cell processor is formed of the plurality of arithmetic circuits comprised in a traffic shaping apparatus within said cell processor.

\* \* \* \* \*

UNITED STATES PATENT AND TRADEMARK OFFICE
CERTIFICATE OF CORRECTION

PATENT NO.: 6,072,776
DATED: June 6, 2000
INVENTOR(S): Toru TAKAMICHI

It is certified that error(s) appears in the above-identified patent and that said Letters Patent is hereby corrected as shown below:

Column 1, line 16, delete "related art" insert --related art, as disclosed in Japanese Patent Application Laid-Open No. Hei 5-327757 (JP A. 5-327757),--.

line 59, delete "is formed" insert --is formed, as disclosed in Japanese Patent Application Laid-Open No. Hei 5-347632 (JP. A. 5-347632),--.

Signed and Sealed this

Seventeenth Day of April, 2001

*Attest:*

NICHOLAS P. GODICI

*Attesting Officer*     *Acting Director of the United States Patent and Trademark Office*